United States Patent [19]

Raffelson et al.

[11] 3,856,824

[45] Dec. 24, 1974

[54] MODIFIED P-V-FE CATALYST FOR PRODUCTION OF MALEIC ANHYDRIDE FROM SATURATED ALIPHATIC HYDROCARBONS

[75] Inventors: Harold Raffelson; Michael Suda, both of St. Louis, Mo.

[73] Assignee: Monsanto Company, St. Louis, Mo.

[22] Filed: Dec. 27, 1971

[21] Appl. No.: 212,795

[52] U.S. Cl. .......................................... 260/346.8 A
[51] Int. Cl. .............................................. C07d 5/00
[58] Field of Search .............................. 260/346.8 A

[56] References Cited
UNITED STATES PATENTS
2,773,921  12/1956  Rylander et al. .............. 260/683.15
3,156,705  11/1964  Kerr ................................. 260/346.8
3,293,268  12/1966  Bergman et al .................. 260/346.8
3,478,063  11/1969  Friedrichsen et al. ........... 260/346.8

FOREIGN PATENTS OR APPLICATIONS
2,058,054  6/1971  Germany

Primary Examiner—Raymond V. Rush
Attorney, Agent, or Firm—N. E. Willis; J. E. Maurer; F. D. Shearin

[57] ABSTRACT

Maleic anhydride is produced by oxidation of saturated aliphatic hydrocarbons in the presence of a catalyst comprising phosphorus, vanadium, iron, oxygen and a catalyst modifier comprising chromium combined with one or more elements selected from the group consisting of nickel, boron, silver, cadmium and barium.

10 Claims, No Drawings

MODIFIED P-V-FE CATALYST FOR PRODUCTION OF MALEIC ANHYDRIDE FROM SATURATED ALIPHATIC HYDROCARBONS

This invention relates to the catalytic production of maleic anhydride. More particularly, the invention relates to a process for the production of maleic anhydride by the oxidation of a saturated aliphatic hydrocarbon having from 4 to 10 carbon atoms, the process being carried out in the presence of a surprisingly advantageous catalyst.

Production of maleic anhydride by the catalytic oxidation of benzene and butene is well known. The principal method currently employed for manufacturing maleic anhydride is by the air oxidation of benzene in the presence of certain heavy metal oxide catalysts.

Comparatively little attention, however, has been given to the use of saturated aliphatic hydrocarbons, e.g., butane, as feedstocks for the preparation of maleic anhydride. This is due in part to the fact that butane is more difficult to oxidize than benzene or butene, often resulting in low conversions to maleic anhydride and an uneconomical process. Although catalysts for the oxidation of saturated aliphatic hydrocarbons are known, the yields of the desired maleic anhydride product over the known catalysts are, in most cases, insufficiently high to make such feedstocks competitive with benzene. Efficient conversion of the saturated aliphatic hydrocarbon to maleic anhydride, together with longer catalyst life, is desirable.

Accordingly, it is an object of the present invention to provide a process for obtaining improved yields and selectivity of maleic anhydride together with improvements in catalyst stability.

A further object of the present invention is to provide a process for the catalytic oxidation of saturated aliphatic hydrocarbons to maleic anhydride in improved yields and improved selectivities.

Still a further object of the present invention is to provide an improved type of catalyst for carrying out the catalytic oxidation of saturated aliphatic hydrocarbons to maleic anhydride.

These and other objects are accomplished according to the present invention by oxidizing a saturated aliphatic hydrocarbon having from 4 to 10 carbon atoms, in the presence of a catalyst comprising phosphorus, vanadium, iron, oxygen and a catalyst modifier comprising chromium combined with an element selected from the group consisting of nickel, boron, silver, cadmium and barium, and mixtures of said elements. When the phosphorus, vanadium and iron are present in defined proportions, together with the chromium-containing catalyst modifier, unexpected improvements are achieved in yields of maleic anhydride from saturated aliphatic hydrocarbon feedstocks, as compared to results obtained with similar phosphorus-vanadium-iron-oxygen catalyst compositions having no chromium-containing modifier. Improvements in catalyst stability have also been observed.

Optimum results are obtained according to the present invention when the atomic ratio of phosphorus to vanadium in the active component of the catalyst is between about 4:1 and about 9:1 with the atomic ratio of iron to vanadium between about 1:1 and about 4:1. Thus, it is preferred to employ catalysts having proportions of the three basic metals within the aforementioned ranges. The chromium-containing modifier can be present in a stabilizing amount from about 2 atomic percent to about 25 atomic percent, preferably from about 5 atomic percent to about 15 atomic percent. By "atomic percent" herein is meant the fractional part (expressed as a percentage of the atomic sum) of the metals, including the chromium-containing modifier, present in the active component of the catalyst. An outstanding catalyst composition within the scope of the present invention contained 60.003 atomic percent phosphorus, 8.710 atomic percent vanadium, 18.500 atomic percent iron, 6.787 atomic percent chromium and 6.000 atomic percent silver, representing a phosphorus to vanadium atomic ratio of 6.89:1 and an iron to vanadium atomic ratio of 2.12:1.

Superior results can still be realized, however, when the atomic ratio of phosphorus to vanadium is maintained between about 1:1 and about 15:1, while the atomic ratio of iron to vanadium is between about 0.2:1 and about 6:1, again with a stabilizing amount of the chromium-containing modifier present.

The catalyst taught by the present invention can be prepared in a variety of ways readily apparent to those skilled in the catalyst art. However, it is preferred to prepare them from an aqueous slurry or solution of phosphourus, vanadium, iron and modifier compounds and subsequently heat this aqueous mixture to approximately 90°C. Thereupon, the batch is cooled and ammonium hydroxide is added to obtain the desired pH, the ammonium hydroxide further affording precipitation of the catalyst composition from solution. The catalyst composition can then be deposited onto a support or carrier although it has been found than an unsupported catalyst (without carrier) made, for example, by extruding the catalyst material, usually affords higher yields in the process of the present invention. The catalyst may also be prepared by precipitating the vanadium, phosphorus, iron and modifier compounds, either with or without a carrier, from a colloidal dispersion of the ingredients in an inert liquid. The catalyst may also be prepared by heating and mixing anhydrous forms of phosphoric acid with the vanadium compounds, the iron compounds and the modifier compounds. The catalysts may be used as either fluid bed or fixed bed catalysts. In any of the methods of preparation, heat may be applied to accelerate the formation of the catalyst complex. Although certain methods of catalyst preparation are preferred, any method may be used which results in the formation of the catalyst complex containing the specified ratios of vanadium, phosphorus and iron, together with the desired amount of chromium-containing modifier.

Suitable phosphorus compounds that may be employed in the preparation of catalysts herein include mono-, di- and tri-ammonium phosphates, metaphosphoric acid, triphosphoric acid, pyrophosphoric acid, orthophosphoric acid, phosphorus pentoxide, phosphorus oxyiodide, ethyl phosphate, methyl phosphate, phosphorus pentachloride, phosphorus trichloride, phosphorus oxybromide, iron phosphates and the like.

Suitable vanadium compounds useful as starting materials are compounds such as vanadium pentoxide, ammonium metavanadate, vanadium trioxide, vanadyl chloride, vanadyl dichloride, vanadyl trichloride, vanadium sulfate, vanadium phosphate, vanadium tribromide, vanadyl formate, vanadyl oxalate, metavanadic acid, pyrovanadic acid, vanadyl sulfate and the like.

Various iron compounds, both ferric and ferrous, such as ferrous sulfide, ferric and ferrous halides, ferric and ferrous sulfate, ferric nitrate, ferrous oxalates, ferrous citrate, ferrous phosphates and the like can be used as the source of iron.

The chromium-containing catalyst modifier may be added as a combination of the elements per se or as the compounds thereof such as the oxides, hydroxides, carbonates, phosphates, nitrates, sulfates, and inorganic or organic salts or acids of chromium, nickel, boron, silver, cadmium or barium. Examples of suitable compounds for introduction of the modifier are chromium nitrate, cadmium oxide, nickel nitrate, boric acid, silver nitrate, barium sulfate, cadmium nitrate and the like.

Thus, any vanadium, phosphorus, iron and modifier compounds may be used as starting materials which, when the compounds are combined and heated to dryness in air at a temperature of, for example, 110°C., followed by calcining at, for example, 500°C., will leave as a deposit a catalyst complex having relative proportions within the described ranges. Calcining is most conveniently accomplished by exposing the catalyst composition to a stream of air at a temperature between about 400° and 600°C., but may also be accomplished with an inert gas or oxygen.

Although the catalysts useful in the present invention produce superior results when separately formed, such as by extrusion, and used as pellets without a supporting carrier, it is sometimes desirable to deposit the catalyst material onto a carrier. The carrier may be added to the catalyst complex containing phosphorus, vanadium, iron, oxygen and modifier, or the catalyst solution may be poured onto the carrier. Also, the carrier may be present during the entire course of reactions to provide the desired phosphorus-vanadium-iron-oxygen-modifier complex.

The support or carrier for the phosphorus-vanadium-iron-oxygen-modifier complex, if any, should preferably be inert to the depositing solution containing the complex and should be inert under the catalytic oxidation conditions. The carrier provides not only the required surface for the catalyst, but gives physical strength and stability to the catalyst material. The carrier or support preferably has a low surface area, as usually measured, from about 0.001 to about 5 square meters per gram. Carriers much smaller than 10 to 12 mesh normally cause an undesirable pressure drop in the reactor, unless the catalysts are being used in a fluid bed apparatus. Any of the conventional inert carriers may be used in this capacity, including silica gel, silica alumina, silica carborundum, kieselguhr, boron phosphate, alundum, fuller's earth, pumice, silicon carbide and asbestos.

The amount of catalyst complex (active catalytic component) deposited on the carrier should be sufficient to substantially coat the surface of the carrier. For a fixed bed reactor installation, the final size of the catalyst coated on a carrier will preferably be from about 2½ to about 10 mesh size. The carriers may be of a variety of shapes, the preferred shape being cylindrical or spherical. The size of the catalyst particles used in fluidized bed reactors is quite small, however, usually varying from about 10 to about 150 microns, and in such systems the catalyst normally will not be provided with a carrier but will be formed into the desired particle size after drying from solution.

Inert diluents such as silica may be present in the active portion of the catalyst, but the combined weight of the essential active ingredient of phosphorus, vanadium, iron, oxygen and chromium-containing modifier should preferably consist essentially of at least about 50 weight percent of the composition which is coated on the carrier, if any, and preferably these components are at least about 75 weight percent of the composition coated on the carrier, and more preferably at least about 95 weight percent. If desired, any remainder other than the atoms of phosphorus, vanadium, iron, oxygen and chromium-containing modifier may be essentially inert non-catalytic ingredients intimately combined with the phosphorus, vanadium, iron, oxygen and modifier as a part of the coating on the carrier.

In accordance with the present invention, various saturated aliphatic hydrocarbons having from 4 to 10 carbon atoms are oxidized over the phosphorus-vanadium-iron-oxygen-modifier catalyst complex to produce maleic anhydride. Since n-butane is readily available in good purity at a relatively low price, as compared to other saturated aliphatic hydrocarbons of the indicated class, it is preferred to employ n-butane in the practice of the present invention. Accordingly, principal reference is made in the present specification to the preparation of maleic anhydride by the catalytic oxidation of n-butane. It will be understood, however, that the oxidation of other saturated aliphatic hydrocarbons having from 4 to 10 carbon atoms is within the scope of the present invention.

The process of the present invention is most conveniently carried out by passing a stream of oxygen or oxygen-containing gas, usually air, containing the saturated aliphatic hydrocarbon to be oxidized, over a bed of the catalyst contained in any conventional fixed bed converter tube. The oxidation reaction takes place at temperatures of from about 400° to 600°C., preferably from about 450° to 550°C., under pressures ranging from about 0.5 to 10 atmospheres, desirably about 1 to 5 atomospheres. In the case of n-butane, optimum yields of maleic anhydride are achieved when the n-butane is admixed with air in the proportion of from about 0.5 to 10 mole percent, preferably from about 1 to about 4 mole percent, of the total oxidation mixture, and passed over the catalyst while maintaining a space velocity between about 200 and 7,000 reciprocal hours, preferably in the case of fixed bed reactors, from about 1,000 to 3,000 reciprocal hours. Space velocity is defined herein as the volume of gaseous mixture at 15.5°C. and 760 mm. Hg pressure per volume of empty converter tube in the catalyst zone per hour.

A variety of reactors will be found to be useful and multiple tube heat exchanger type reactors are quite satisfactory. The tubes of such reactors may vary in diameter from about ¼ inch to about 3 inches, and the length may be varied from about 3 to about 10 or more feet. Since the oxidation of n-butane or other saturated aliphatic hydrocarbons within the scope of the present invention is an exothermic reaction, it is often necessary to remove the heat of reaction in order to maintain the reaction temperature within the preferred range of from about 450° to 550°C. It is thus desirable to have the surface of the reactors at a relatively constant temperature and some medium to conduct heat from the reactors is usually necessary to aid temperature control. Such media may be mercury, molten lead and the like, but it has been found that eutectic salt baths are completely satisfactory. One such salt bath is a sodium nitrate-sodium nitrite-potassium nitrate eutectic constant temperature mixture. An additional method of temperature control is to use a metal block reactor whereby the metal surrounding the tube acts as a temperature regulating body. The heat exchange medium may be kept at the proper temperature by heat exchangers and the like. The reactor or reaction tubes may be fabricated of iron, stainless steel, carbon-steel, glass tubes and the like. Normally, the reactors contain a preheat zone of an inert material such as ¼ inch alundum pellets, inert ceramic balls, nickel balls or chips and the like.

The catalytic oxidation reaction may be conducted at atmospheric, superatmospheric or subatmospheric pressure, although superatmospheric pressures are generally employed.

Maleic anhydride produced according to the present invention may be recovered in a number of ways well known to those skilled in the art. For example, the recovery may be by direct condensation or by adsorption in suitable media, with subsequent separation and purification of the maleic anhydride.

Other saturated aliphatic hydrocarbon feedstocks within the scope of the present invention, in addition to butane, are the pentanes, hexanes, heptanes, octanes, nonanes and decanes, or mixtures of any of these with or without butane. The aforementioned feedstocks are not necessarily pure substances but may be technical hydrocarbon fractions containing small amounts, for example, 0.1 to 10 percent by weight of olefinically unsaturated hydrocarbons containing more than 4, for example, 5 or 6, carbon atoms, or containing other hydrocarbon fractions.

The present invention will be more readily understood by reference to the following detailed description of preferred embodiments thereof. In each of the examples set forth below, percentage yields are expressed on the basis of the number of pounds of pure maleic anhydride produced per pound of n-butane fed to the reactor. Also included is the percentage selectivity for each example which is expressed on the basis of the number of pounds of maleic anhydride produced per pound of butane reacted. The temperatures quoted in the tables are reaction temperatures which are considered as equivalent to catalyst temperatures.

To illustrate the improved performance afforded by the presence of the chromium-containing modifier in the catalyst taught by the present invention, Example 1 below is representative of the results achieved with no modifier present. Example 2 and the subsequent examples are illustrative of results obtained with various modified catalysts within the instant scope.

EXAMPLE 1

This example illustrates the preparation of maleic anhydride by the oxidation of n-butane using a catalyst wherein the catalytic component comprised only phosphorus, vanadium, iron and oxygen.

The catalyst was prepared as follows:

4.32 grams of ammonium metavanadate were dissolved in 162 ml. of water with heating and stirring at 80°C. To the hot ammonium metavanadate solution was added a solution comprising 108 ml. of water, 23.89 grams of ferric nitrate enneahydrate, 20.0 grams of 85 percent orthophosphoric acid and 2.49 ml. of nitric acid. The batch was heated to 90°C. and held, with stirring, for about 10 minutes. The batch was then cooled below 60°C. and 23.14 ml. of ammonium hydroxide were added to obtain a pH of approximately 8. A silica alumina carrier (100 grams) having a screen size of 3 to 5 mesh was added and the batch was heated on a steam bath to 90°C. with stirring. The catalyst and carrier was then dried in a 110°C. oven for approximately 15 hours, followed by calcining at 500°C. for about 4 hours in a tube with air passing over the batch. After screening with a number 6 mesh screen, 80.9 grams of supported catalyst were recovered which had a calculated composition (in the catalytic component) of 13.71 atomic percent vanadium, 64.35 atomic percent phosphorus and 21.94 atomic percent iron.

The resulting catalyst was charged (in a volume of 50 ml.) to a 1 inch I.D. fixed bed glass reactor tube and heated to about 500°C. A gaseous mixture, predominantly air, containing approximately 1.6 mole percent of n-butane was passed through the catalyst bed while maintaining a nominal space velocity of 1200 reciprocal hours. The maleic anhydride thus prepared was removed from the gaseous mixture by scrubbing the reactor effluent gases in water. In successive runs conducted under slightly varying operating conditions, the following results were obtained.

TABLE I

| Temp. °C. | n-Butane Feed - mole % of Feedgas | Space Velocity Hours$^{-1}$ | Yield % | Selectivity % |
|---|---|---|---|---|
| 495 | 1.591 | 1203 | 25.7 | 91.0 |
| 500 | 1.583 | 1203 | 21.4 | 83.5 |
| 505 | 1.587 | 1214 | 19.4 | 79.0 |
| 505 | 1.565 | 1214 | 19.4 | 90.0 |
| 505 | 1.606 | 1214 | 16.9 | 75.2 |

EXAMPLE 2

This example illustrates the preparation of maleic anhydride by the oxidation of n-butane using a supported catalyst within the present invention wherein the active catalytic component comprises phosphorus, vanadium, iron and oxygen modified with chromium and silver.

2.00 grams of ammonium metavanadate were dissolved in 125 ml. of water with heating and stirring at 75°C. To the hot ammonium metavanadate solution were added 13.59 grams of 85 percent orthophosphoric acid, 14.68 grams of ferric nitrate enneahydrate, 5.33 grams of chromic nitrate enneahydrate and 2.00 grams of silver nitrate. The batch was heated to 90°C. and held, with stirring, for 1 hour followed by cooling to 50°C. and the addition of 26.0 ml. of ammonium hydroxide to achieve a pH of 8. The batch was then heated to 90°C. for approximately 2 hours and 80 grams of silica alumina carrier having a screen size of 3 to 5 mesh were added to the batch followed by stirring for 30 minutes. The catalyst and carrier blend was then dried in a 110°C. oven for 4 hours, screened with a Number 6 mesh screen, then calcined at 500° C. After further screening, 91.1 grams of supported catalyst were recovered which had a calculated metal composition in the catalytic component, i.e., exclusive of the carrier, of 60.003 atomic percent phosphorus, 8.710 atomic percent vanadium, 18.5 atomic percent iron, 6.787 atomic percent chromium and 6.00 atomic percent silver. The resulting catalyst was charged to a 6 inch long fixed bed glass reactor tube having a 1 inch I.D., and the catalyst was heated to about 500°C. A gaseous mixture, predominantly air, containing about 1.5 mole percent of n-butane was passed through the catalyst bed while maintaining a nominal space velocity of 1,250 reciprocal hours. The maleic anhydride product was removed from the gaseous stream by scrubbing the reactor effluent gases in water. The following results were obtained from successive runs with this catalyst:

TABLE II

| Temp. °C. | n-Butane Feed - mole % of Feedgas | Space Velocity Hours$^{-1}$ | Yield % | Selectivity % |
|---|---|---|---|---|
| 490 | 1.49 | 1250 | 23.0 | 73.2 |
| 510 | 1.45 | 1250 | 34.4 | 71.5 |
| 520 | 1.46 | 1250 | 36.5 | 63.7 |
| 530 | 1.42 | 1250 | 37.4 | 58.5 |
| 540 | 1.46 | 1250 | 37.0 | 52.4 |

EXAMPLE 3

This example illustrates the preparation of maleic anhydride from n-butane with a supported catalyst wherein the catalytic component comprises phosphorus, vandium, iron and oxygen modified with chromium and boron.

2.17 grams of ammonium metavanadate were dissolved in about 125 ml. of water with heating and stirring at 75°C. To the hot ammonium metavanadate solution were added 16.66 grams of ferric nitrate enneahydrate, 4.13 grams of chromic nitrate enneahydrate, 0.38 grams of boric acid, 14.98 grams of 85 percent orthophosphoric acid and 0.5 ml. of nitric acid. The batch was heated to 90°C. and held, with stirring, for 1 hour followed by cooling to 50°C. and the addition of ammonium hydroxide to obtain a pH of 8. The batch was then heated to 90°C. for about 2 hours and 80 grams of silica alumina carrier having a screen size of 3 to 5 mesh were added to the batch followed by stirring for 30 minutes. The catalyst and carrier blend was dried in a 110°C. oven for 4 hours, screened with a Number 6 mesh screen, then calcined at 500°C. After further screening, 92.5 grams of supported catalyst were recovered which had a calculated metal composition in the catalytic component of 63.0 atomic percent phosphorus, 9.0 atomic percent vanadium, 20.0 atomic percent iron, 5.0 atomic percent chromium and 3.0 atomic percent boron. The resulting catalyst was charged to a 6 inch long fixed bed glass reactor tube having a 1 inch I.D., and the catalyst was heated to about 500°C. A gaseous mixture, predominantly air, containing about 1.5 mole percent of n-butane was passed through the catalyst bed while maintaining a nominal space velocity of 1,130 reciprocal hours. The maleic anhydride product was removed by water-srubbing of the effluent gases. The following results were obtained under slightly varying operating conditions:

TABLE III

| Temp. °C. | n-Butane Feed - mole % of Feedgas | Space Velocity Hours$^{-1}$ | Yield % | Selectivity % |
|---|---|---|---|---|
| 500 | 1.41 | 1129 | 22.3 | 78.3 |
| 520 | 1.42 | 1129 | 33.3 | 74.8 |
| 530 | 1.42 | 1129 | 35.7 | 66.8 |
| 540 | 1.44 | 1129 | 37.7 | 61.9 |

EXAMPLE 4

This example presents the preparation of maleic anhydride from n-butane according to the present invention with a supported catalyst comprising phosphorus, vanadium, iron and oxygen modified with chromium and nickel.

2.14 grams of ammonium metavanadate were dissolved in about 125 ml. of water with heating and stirring at 75°C. To the hot ammonium metavanadate solution were added 14.54 grams of 85 percent orthophosphoric acid, 12.33 grams of ferric nitrate enneahydrate, 6.51 grams of chromic nitrate enneahydrate and 3.55 grams of nickel nitrate hexahydrate. The batch was heated to 90°C. and held, with stirring, for 1 hour followed by cooling to 50°C. and the addition of 24.2 ml. of ammonium hydroxide to achieve a pH of 8. The batch was then heated to 90°C. for about 2 hours and 80 grams of silica alumina carrier having a screen size of 3 to 5 mesh were added to the batch followed by stirring for 30 minutes. The catalyst and carrier blend was then dried in a 110°C. oven for 4 hours, screened with a Number 6 mesh screen, then calcined at 500°C. After further screening, 91.4 grams of supported catalyst were recovered which had a calculated metal composition in the catalytic component of 62.0 atomic percent phosphorus, 9.0 atomic percent vanadium, 15.0 atomic percent iron, 8.0 atomic percnt chromium and 6.0 atomic percent nickel. The resulting catalyst was charged to a 6 inch long fixed bed glass reactor tube having a 1 inch I.D., and the catalyst was heated to about 500°C. A gaseous mixture, predominanty air, containing about 1.5 mole percent of n-butane was passed through the catalyst bed while maintaining a nominal space velocity of 1,230 reciprocal hours. The maleic anhydride product was removed by water-scrubbing of the effluent gases and the following results were obtained under slightly varying operating conditions:

TABLE IV

| Temp. °C. | n-Butane Feed - mole % of Feedgas | Space Velocity Hours$^{-1}$ | Yield % | Selectivity % |
|---|---|---|---|---|
| 500 | 1.45 | 1230 | 24.5 | 74.8 |
| 530 | 1.47 | 1230 | 29.9 | 64.6 |
| 530 | 1.48 | 1230 | 32.6 | 66.6 |
| 540 | 1.46 | 1230 | 34.8 | 60.5 |

EXAMPLE 5

This example illustrates the preparation of maleic anhydride from n-butane with a supported catalyst comprising phosphorus, vanadium, iron and oxygen modified with chromium, nickel and silver.

1.92 grams of ammonium metavanadate were dissolved in about 125 ml. of water with heating and stirring at 75°C. To the hot ammonium metavanadate solution were added 12.22 grams of 85 percent orthophosphoric acid, 11.33 grams of ferric nitrate enneahydrate, 5.11 grams of chromic nitrate enneahydrate, 3.11 grams of nickel nitrate hexahydrate, 1.68 grams of silver nitrate and 1.39 grams of ferric phosphate trihydrate. The batch was heated to 90°C. and held, with stirring, for 1 hour followed by cooling to 50°C. and the addition of 28.3 ml. of ammonium hydroxide to obtain a pH of 8. The batch was then heated to 90°C. for 2 hours and 80 grams of silica alumina carrier having a screen size of 3 to 5 mesh were added to the batch followed by stirring for 30 minutes. The catalyst and carrier blend was then dried in a 110°C. oven for 4 hours, screened with a Number 6 mesh screen, and calcined at 500°C. After further screening, 92.1 grams of supported catalyst were recovered which had a calculated metal composition in the catalytic component of 57.179 atomic percent phosphorus, 8.3 atomic percent vanadium, 17.629 atomic percent iron, 6.468 atomic percent chromium, 5.424 atomic percent nickel and 5.00 atomic percent silver. The resulting catalyst was charged to a 6 inch long fixed bed glass reactor tube having a 1 inch I.D., and the catalyst was heated to about 500°C. A gaseous mixture, predominantly air, containing about 1.5 mole percent of n-butane was passed through the catalyst bed while maintaining a nominal space velocity of 1,250 reciprocal hours. The maleic anhydride product was removed by water-scrubbing of the effluent gases, the following results being obtained in successive runs:

TABLE V

| Temp. °C. | n-Butane Feed - mole % of Feedgas | Space Velocity Hours$^{-1}$ | Yield % | Selectivity % |
|---|---|---|---|---|
| 510 | 1.52 | 1250 | 28.2 | 61.5 |
| 520 | 1.51 | 1250 | 30.1 | 52.0 |
| 530 | 1.50 | 1250 | 31.6 | 50.4 |

EXAMPLE 6

This example illustrates the preparation of maleic anhydride by the oxidation of n-butane using a supported catalyst within the present invention wherein the active catalytic component comprises phosphorus, vanadium, iron and oxygen modified with chromium and cadmium. The catalyst was prepared as follows:

1.98 grams of ammonium metavanadate were dissolved in 125 ml. of water with heating and stirring at 75°C. To the hot ammonium metavanadate solution were added 13.46 grams of 85 percent orthophosphoric acid, 14.54 grams of ferric nitrate enneahydrate, 5.28 grams of chromic nitrate enneahydrate and 3.60 grams of cadmium nitrate tetrahydrate. The batch was heated to 90°C. and held, with stirring, for 1 hour followed by cooling to 50°C. and the addition of 23.9 ml. of ammonium hydroxide to obtain a pH of 8. The batch was then heated to 90°C. for about 2 hours and 80 grams of silica alumina carrier having a screen size of 3 to 5 mesh were added to the batch followed by stirring for 30 minutes. The catalyst and carrier blend was then dried in a 110°C. oven for 4 hours, screened with a Number 6 mesh screen, and calcined at 500° C. After further screening, 89.8 grams of supported catalyst were recovered which had a calculated metal composition in the catalytic component of 60.003 atomic percent phosphorus, 8.710 atomic percent vanadium, 18.500 atomic percent iron, 6.787 atomic percent chromium and 6.000 atomic percent cadmium.

The resulting catalyst was charged to a 6 inch long fixed bed glass reactor tube having a 1 inch I.D. and the catalyst was heated to about 500°C. A gaseous mixture, predominantly air, containing about 1.5 mole percent of n-butane was passed through the catalyst bed while maintaining a nominal space velocity of 1,115 reciprocal hours. The maleic anhydride product was removed by water-scrubbing of the effluent gases and the following results were obtained on successive runs at increasing temperatures:

TABLE VI

| Temp. °C. | n-Butane Feed - mole % of Feedgas | Space Velocity Hours$^{-1}$ | Yield % | Selectivity % |
|---|---|---|---|---|
| 500 | 1.55 | 1116 | 19.1 | 74.4 |
| 520 | 1.57 | 1116 | 28.2 | 65.6 |
| 530 | 1.55 | 1116 | 33.3 | 60.4 |
| 540 | 1.55 | 1116 | 33.5 | 53.1 |

EXAMPLE 7

This example illustrates the preparation of maleic anhydride from n-butane with an unsupported catalyst within the present scope comprising phosphorus, vanadium, iron and oxygen modified with chromium and barium, the catalyst being shaped by extrusion.

13.03 grams of ammonium metavanadate were dissolved in 400 cc. of water with heating and stirring at about 75°C. To this solution were added 99.55 grams of 85 percent orthophosphoric acid, 112.54 grams of ferric nitrate enneahydrate, 44.58 grams of chromic nitrate enneahydrate and 5.50 grams of barium carbonate which was converted to the nitrate with 3.48 cc. of nitric acid. The batch was heated to 90°C. and held, with stirring, for 1 hour followed by cooling to 50°C. and the addition of 185 ml. of ammonium hydroxide to obtain a pH of 8. Water was then distilled off until a thick slurry was formed whereupon three-sixteenth inch unsupported and calcined pellets were obtained by extrusion. This unsupported catalyst had a calculated metal composition of 62.0 atomic percent phosphorus, 8.0 atomic percent vanadium, 20.0 atomic percent iron, 8.0 atomic percent chromium and 2.0 atomic percent barium.

The resulting catalyst was charged to a 6 inch long fixed bed glass reactor tube having a 1 inch I.D. and the catalyst was heated to about 450°C. A gaseous mixture, predominantly air, containing about 1.5 mole percent of n-butane was passed through the catalyst bed while maintaining a nominal space velocity of 1,150 reciprocal hours. The maleic anhydride produce was removed by water-scrubbing of the effluent gases and the following results were obtained:

TABLE VII

| Temp. °C. | n-Butane Feed - mole % of Feedgas | Space Velocity Hours$^{-1}$ | Yield % | Selectivity % |
|---|---|---|---|---|
| 445 | 1.53 | 1152 | 50.9 | 74.6 |
| 450 | 1.58 | 1156 | 53.0 | 71.6 |
| 455 | 1.59 | 1150 | 51.2 | 62.9 |

By comparing the results of Examples 2 through 6 above with the results of Example 1, it can readily be observed that the presence of the chromium-containing modifier in the phosphorus-vanadium-iron-oxygen catalyst contributes to the improved process for the production of maleic anhydride from saturated aliphatic hydrocarbons. It has thus been found that higher operating temperatures, e.g., 520°C., appear to cause the oxidation catalyst to lose stability faster than at temperatures such as 470°C. The reduced stability is chracterized by lower yields of maleic anhydride. By reference to Table I, for example, it is seen that the yields of maleic anhydride diminished at higher oxidation temperatures, there being no chromium-containing modifier present in the catalyst complex. This yield reduction trend at increased temperatures was much less pronounced with the modified catalysts as illustrated by Tables II through VI above. Table VII illustrates that excellent yields can be achieved at lower oxidation temperatures with unsupported catalysts of the present invention.

The suprising and unexpected nature of the present invention is illustrated by the discovery that chromium in combination with nickel, boron, silver, cadmium or barium is outstanding as a modifier for the phosphorus-vanadium-iron-oxygen catalyst for oxidation of saturated aliphatic hydrocarbons to maleic anhydride. It is not completely understood why the presence of the chromium-containing modifier contributes to superior catalyst performance.

A further illustration of the efficacy of the phosphorus-vanadium-iron-oxygen modifier catalyst hereinbefore described is the essentially perfect material balance which can be demonstrated. Thus, when computing the percentage of n-butane which is converted to maleic anhydride, along with the percentage of feed gas which goes to carbon monoxide and carbon dioxide, it has consistently been found that no compounds remain unaccounted for in the process.

Still another indication of the superiority of the present process is the avoidance of tar formation in the reaction equipment and the essentially water white appearance of the maleic anhydride liquor produced.

While this invention has been described with reference to various specific examples and emobodiments, it is understood that the invention is not limited thereto and that it can be variously practiced within the scope of the following claims.

The embodiments of the invention in which an exclusive property or privilege is claimed are defined as follows:

1. In a process for producing maleic anhydride by the catalytic oxidation of a saturated aliphatic hydrocarbon having from 4 to 10 carbon atoms wherein a stream of oxygen or oxygen-containing gas containing from about 0.5 to about 10 mole percent hydrocarbon is passed over the catalyst at a space velocity of between about 200 and 7,000 reciprocal hours at a temperature of from about 400° to about 600°C. under a pressure ranging from about 0.5 to 10 atmospheres, the improvement which comprises conducting said oxidation in the presence of a catalyst complex consisting essentially of phosphorus, vanadium, iron, oxygen, and a catalyst modifier of chromium combined with an element selected from the group consisting of nickel, boron, silver, cadmium, barium and a mixture of said elements, wherein the atomic ratio of phosphorus to vanadium is from about 1:1 to about 15:1, the atomic ratio of iron to vanadium is from about 0.2:1 to about 6:1 and the catalyst modifier is present in the range of from about 2 to about 25 atomic percent of the active metals.

2. A method of claim 1 wherein the atomic ratio of phosphorus to vanadium in the catalyst is from about 4:1 to about 9:1, the atomic ratio of iron to vanadium is from about 1:1 to about 4:1, and the catalyst modifier is present in the range of from about 5 to about 15 atomic percent of the active metals.

3. A method of claim 1 wherein the hydrocarbon comprises from about 1 mole percent to about 4 mole percent of the oxidation mixture.

4. A method of claim 1 wherein the hydrocarbon is n-butane.

5. In a process of claim 2 wherein the catalyst modifier comprises chromium combined with silver.

6. In a process of claim 2 wherein the catalyst modifier comprises chromium combined with boron.

7. In a process of claim 2 wherein the catalyst modifier comprises chromium combined with nickel.

8. In a process of claim 2 wherein the catalyst modifier comprises chromium combined with nickel and silver.

9. In a process of claim 2 wherein the catalyst modifier comprises chromium combined with cadmium.

10. In a process of claim 2 wherein the catalyst modifier comprises a chromium combined with barium.

* * * * *